(12) United States Patent
Cha

(10) Patent No.: US 12,497,108 B2
(45) Date of Patent: Dec. 16, 2025

(54) VEHICLE BODY STRUCTURE

(71) Applicants: Hyundai Motor Company, Seoul (KR); Kia Corporation, Seoul (KR)

(72) Inventor: Hyo Seop Cha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 442 days.

(21) Appl. No.: 18/180,959

(22) Filed: Mar. 9, 2023

(65) Prior Publication Data

US 2024/0124070 A1 Apr. 18, 2024

(30) Foreign Application Priority Data

Oct. 18, 2022 (KR) .................. 10-2022-0134240

(51) Int. Cl.
*B62D 25/20* (2006.01)
(52) U.S. Cl.
CPC ................. *B62D 25/2027* (2013.01)
(58) Field of Classification Search
USPC .................................. 296/203.04
See application file for complete search history.

(56) References Cited

U.S. PATENT DOCUMENTS

| | | | |
|---|---|---|---|
| 4,759,580 A | 7/1988 | Berklich, Jr. et al. | |
| 5,529,376 A | 6/1996 | Jovan et al. | |
| 9,950,643 B2* | 4/2018 | Ishijima ................. | B60N 2/28 |
| 11,040,740 B2* | 6/2021 | Grottke ................. | B62D 27/065 |
| 11,192,594 B2* | 12/2021 | Ishimoto ................. | B62D 25/20 |
| 11,285,796 B2* | 3/2022 | Choi ..................... | B60K 1/04 |
| 11,420,509 B2* | 8/2022 | Saeki ..................... | B60R 22/26 |
| 11,939,003 B2* | 3/2024 | Kang .................. | B62D 25/087 |
| 12,351,029 B2* | 7/2025 | Natsume ............... | B62D 21/02 |
| 12,351,243 B2* | 7/2025 | Cha ...................... | B62D 25/08 |
| 2006/0061143 A1 | 3/2006 | Okana et al. | |
| 2006/0087109 A1 | 4/2006 | Kusu et al. | |
| 2012/0318591 A1 | 12/2012 | Lim et al. | |
| 2019/0299823 A1* | 10/2019 | Tomita ................. | B60N 2/015 |
| 2020/0130544 A1* | 4/2020 | Schmidt ................. | B60N 2/20 |
| 2022/0204093 A1 | 6/2022 | Kang | |

FOREIGN PATENT DOCUMENTS

| | | |
|---|---|---|
| EP | 1612128 A1 | 1/2006 |
| FR | 3018231 A1 | 9/2015 |
| JP | H0840117 A | 2/1996 |
| JP | 2004291682 A | 10/2004 |
| JP | 2007083788 A | 4/2007 |
| JP | 2015003634 A | 1/2015 |
| KR | 20000021451 U | 12/2000 |
| KR | 20140122150 A | 10/2014 |
| KR | 20220096102 A | 7/2022 |

* cited by examiner

*Primary Examiner* — Amy R Weisberg
*Assistant Examiner* — Veronica M Condo
(74) *Attorney, Agent, or Firm* — Slater Matsil, LLP

(57) ABSTRACT

An embodiment vehicle body structure includes a floor panel, a front mounting member on an upper side of the floor panel, wherein the front mounting member protrudes and extends in a lateral direction of a vehicle body so as to fix a front lower side of a seat, and a partition member at a rear of the front mounting member, wherein the partition member protrudes and extends in the lateral direction of the vehicle body so as to fix a rear lower side of the seat.

20 Claims, 9 Drawing Sheets

VEHICLE BODY STRUCTURE

CROSS-REFERENCE TO RELATED APPLICATIONS

This application claims the benefit of Korean Patent Application No. 10-2022-0134240, filed on Oct. 18, 2022, which application is hereby incorporated herein by reference.

TECHNICAL FIELD

The present invention relates to a vehicle body structure.

BACKGROUND

Recently, the floor of a vehicle is often formed to be flat up to the rear of a vehicle body.

For example, as the floor position is lowered in the vehicle, a vehicle such as a purpose built vehicle (PBV) tends to form a flat shape up to the rear of a vehicle body.

More specifically, the PBV is formed of a life module configured to form various types of boarding and loading spaces in consideration of market demands, and a drive module related to actual vehicle driving. Here, since a constant drive module is combined with various life modules based on the consumer's interests and needs, various types of vehicles may be easily manufactured, thereby making it possible to effectively respond to the market trend of diversified small-quantity production.

As described above, in the case of a vehicle having a flat floor up to the rear of a vehicle body, when a seat is installed near a rear wheel, a large difference is formed between the height of the floor and the height of the seat seating surface, which makes it difficult to stably mount the seat on the floor.

The information disclosed in this background section is only for enhancement of understanding of the general background of embodiments of the invention, and should not be taken as an acknowledgement or any form of suggestion that this information forms the related art already known to a person skilled in the art.

SUMMARY

Therefore, embodiments of the present invention address problems in the related art, and an embodiment of the present invention provides a vehicle body structure configured not only to stably fix a seat on the floor in the state in which there is a large difference between the height of the floor near a rear wheel of a vehicle and the height of the seating surface of the seat mounted on the floor, but also to further improve the rigidity of a vehicle body without excessively increasing the weight of the vehicle.

In accordance with an embodiment of the present invention, the above and other features can be accomplished by the provision of a vehicle body structure including a floor panel, a front mounting member provided on an upper side of the floor panel, wherein the front mounting member is formed to protrude and extend in a lateral direction of a vehicle body so as to fix a front lower side of a seat, and a partition member provided at a rear of the front mounting member, wherein the partition member is formed to protrude and extend in the lateral direction of the vehicle body so as to fix a rear lower side of the seat.

Opposite ends of the floor panel may be respectively connected to quarter inner panels, opposite ends of the partition member may be respectively coupled to the quarter inner panels, and opposite ends of the front mounting member may be respectively coupled to the quarter inner panels.

The floor panel may have sidewall parts respectively formed to be bent upwards on opposite sides thereof, and may extend laterally from each of the sidewall parts so as to be connected to a corresponding one of the quarter inner panels, and the partition member may be coupled to the floor panel while a lower end thereof is deformed along curvature of the floor panel in the lateral direction of the vehicle body.

The front mounting member may be coupled to the floor panel while being deformed along the curvature of the floor panel in the lateral direction of the vehicle body.

The partition member may include a front surface part coupled to the upper side of the floor panel, a rear surface part coupled to the upper side of the floor panel while being spaced apart from the front surface part toward a rear of the vehicle body, and an upper surface part configured to connect upper ends of the front surface part and the rear surface part, wherein each of the front surface part, the upper surface part, and the rear surface part may have a panel shape.

The partition member may have at least one bulkhead provided therein.

The front surface part, the upper surface part, and the rear surface part of the partition member and the floor panel may form a closed cross-section, and the front surface part or the rear surface part may have a passing hole provided therein.

The partition member may have a plurality of seat mounting brackets provided on an upper portion thereof and configured to fix the seat.

The floor panel may have vehicle body rear side members provided on a lower side thereof, wherein the vehicle body rear side members may be respectively provided on opposite sides of the vehicle body inside the sidewall parts respectively formed on the opposite sides of the floor panel and formed to extend in a longitudinal direction of the vehicle body, and the floor panel may have a first rear cross member provided on the lower side thereof, wherein the first rear cross member may be formed to extend in the lateral direction of the vehicle body so as to connect front ends of the vehicle body rear side members respectively provided on the opposite sides of the vehicle body.

The floor panel may have a second rear cross member provided on the lower side thereof and formed to extend in the lateral direction of the vehicle body so as to connect rear ends of the vehicle body rear side members respectively provided on the opposite sides of the vehicle body.

The floor panel may further have a third rear cross member provided on the lower side thereof and formed to extend in the lateral direction of the vehicle body so as to connect the vehicle body rear side members respectively provided on the opposite sides of the vehicle body, wherein the third rear cross member may be disposed between the first rear cross member and the second rear cross member.

In accordance with another embodiment of the present invention, there is provided a vehicle body structure including a floor panel, vehicle body rear side members respectively disposed on opposite sides of a lower side of the floor panel and formed to extend in a longitudinal direction of a vehicle body, a first rear cross member formed to extend in a lateral direction of the vehicle body so as to connect front ends of the vehicle body rear side members, a second rear cross member formed to extend in the lateral direction of the vehicle body so as to connect rear ends of the vehicle body rear side members, a front mounting member disposed on an upper side of the floor panel between the first rear cross member and the second rear cross member and formed to extend in the lateral direction of the vehicle body so as to fix a front lower side of a seat, and a partition member disposed on the upper side of the floor panel between the first rear cross member and the second rear cross member and formed to extend in the lateral direction of the vehicle body so as to fix a rear lower side of the seat.

The floor panel may have sidewall parts deformed upwards from a center of the floor panel toward opposite sides thereof, and may extend laterally from each of the sidewall parts so as to be connected to a corresponding one of the quarter inner panels.

The partition member may include, to form a closed cross-section using a vertical cross-section in the longitudinal direction of the vehicle body and the floor panel, a front surface part coupled to the upper side of the floor panel and positioned on a front side of the closed cross-section, a rear surface part coupled to the upper side of the floor panel and positioned on a rear side of the closed cross-section, and an upper surface part configured to connect upper ends of the front surface part and the rear surface part.

The front surface part and the rear surface part of the partition member respectively may have lower ends thereof deformed along a curvature of the floor panel in the lateral direction of the vehicle body, and opposite ends of the partition member may be respectively coupled to the quarter inner panels.

The partition member may have a plurality of bulkheads provided therein and coupled to at least two of the front surface part, the rear surface part, the upper surface part, or the floor panel.

The partition member may include a plurality of seat mounting brackets configured to fix the seat.

The front mounting member may be deformed along a change in shape of the floor panel in the lateral direction of the vehicle body and may have opposite ends thereof respectively coupled to the quarter inner panels.

The vehicle body structure may further include a third rear cross member provided between the first rear cross member and the second rear cross member and configured to connect the vehicle body rear side members respectively provided on the opposite sides of the floor panel.

A frame may be coupled to the lower side of the floor panel and a lower side of the second rear cross member.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Figure 1:
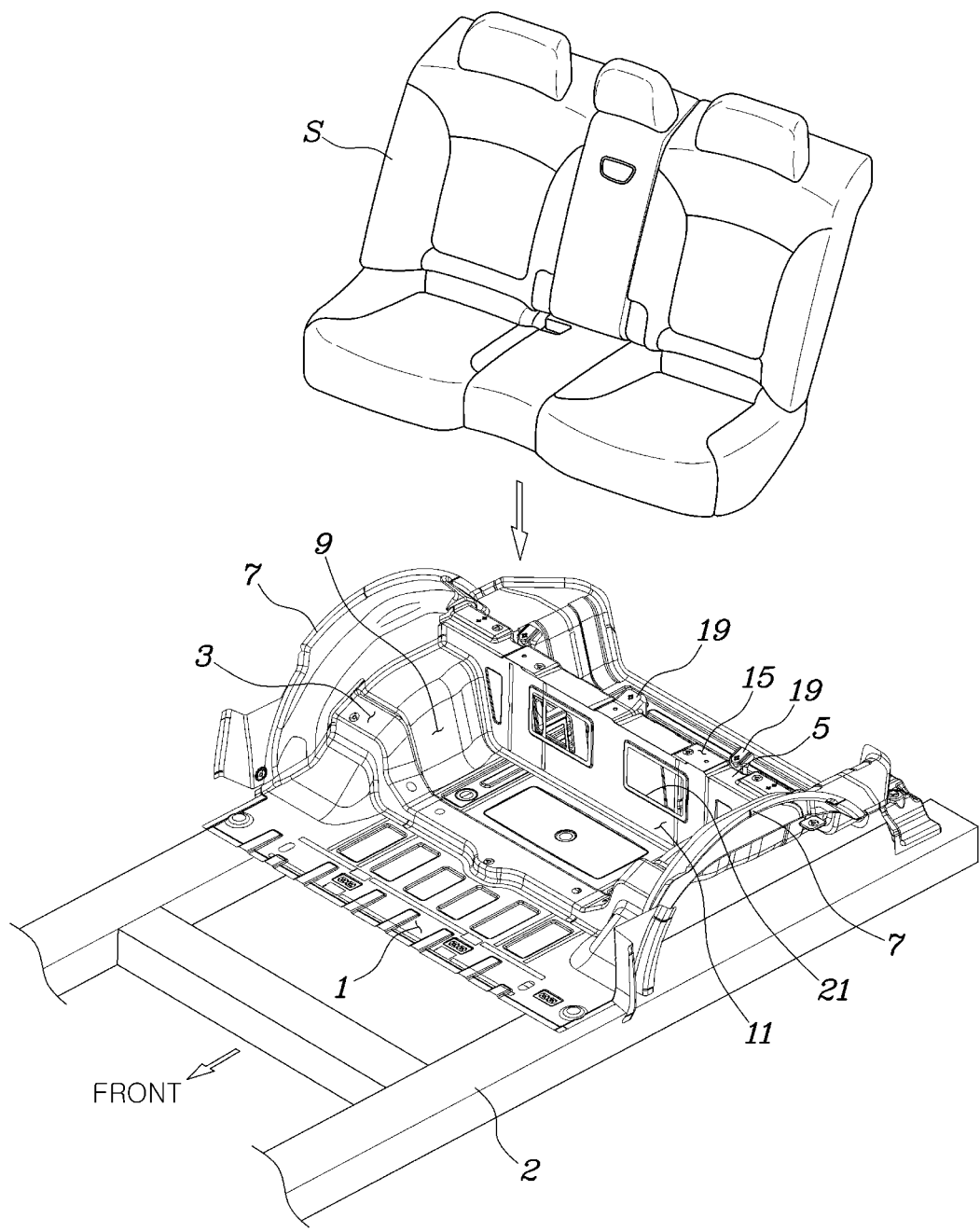
FIG. 1 is a view showing a vehicle body structure according to embodiments of the present invention.
Figure 2:
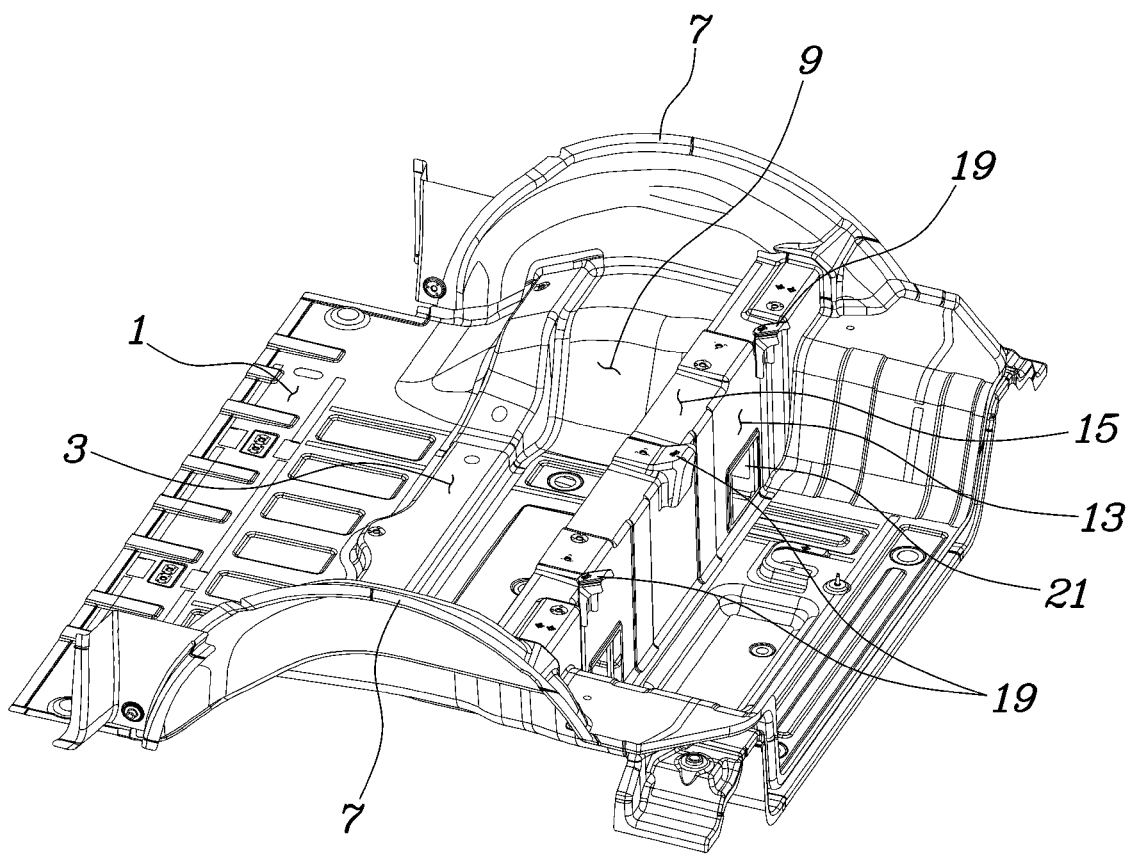
FIG. 2 is a view showing the vehicle body structure in FIG. 1, viewed from another angle.

Reference will now be made in detail to the preferred embodiments of the present invention, examples of which are illustrated in the accompanying drawings. Wherever possible, the same reference numbers will be used throughout the drawings to refer to the same or like parts, and redundant descriptions thereof will be omitted.

Hereinafter, suffixes "module," "unit," and "part" for components used in the following description are merely provided for facilitation of preparing this specification. Therefore, significant meanings or roles are not given to the suffixes themselves and it is understood that the expressions "module", "unit", and "part" may be used together or interchangeably.

In describing the embodiments disclosed herein, when it is determined that the detailed description of publicly known techniques to which the invention pertains may obscure the gist of the embodiments of the present invention, the detailed description will be omitted. Further, it should be understood that the accompanying drawings are merely illustrated to easily describe the embodiments disclosed in this specification, and therefore, the technical idea disclosed in this specification is not limited by the accompanying drawings. Further, it should be noted that the accompanying drawings include all modifications, equivalents, and substitutes that fall within the spirit and technical scope of the present invention.

Meanwhile, in describing embodiments of the present invention, terms such as "first" and/or "second" may be used to describe various components, but the components are not limited by the terms. The terms are used only for the purpose of distinguishing one component from other components.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween.

In this specification, an expression in a singular form also includes the plural sense, unless clearly specified otherwise in context.

It should be understood that expressions such as "comprise" and "have" in this specification are intended to designate the presence of indicated features, numbers, steps, operations, components, pails, or combinations thereof, but do not exclude the presence or addition of one or more features, numbers, steps, operations, components, parts, or combinations thereof.

In addition, a unit or a control unit included in the names of a motor control unit (MCU), a hybrid control unit (HCU), and the like is a term widely used for the name of a control device (controller) configured to control a specific vehicle function, and does not mean a general functional unit.

In order to control various functions, a controller may include a communication device configured to communicate with another controller or a sensor, a memory configured to store an operating system, a logical command, and input/output information, and one or more processors required to control functions of the controller and configured to perform determination, calculation, and the like.

Referring to FIGS. 1 to 8, a vehicle body structure according to embodiments of the present invention includes a floor panel 1, a front mounting member 3 provided on the upper side of the floor panel, wherein the front mounting member 3 is formed to protrude and extend in a lateral direction of a vehicle body so as to fix the front lower side of a seat S, and a partition member 5 provided at the rear of the front mounting member 3 and formed to protrude and extend in the lateral direction of the vehicle body so as to fix the rear lower side of the seat S.

That is, in the embodiments of the present invention, the seat S is mounted on the upper side of the floor panel 1, and the seat S is mounted using the front mounting member 3 and the partition member 5.

That is, a difference between the height of the seating surface of the seat S and the height of the floor panel 1 is reduced by the partition member 5 and the front mounting member 3, and the seat S is rigidly fixed by the partition member 5 and the front mounting member 3, thereby further improving the rigidity of the vehicle body.

The opposite ends of the floor panel 1 are respectively connected to quarter inner panels 7, the opposite ends of the partition member 5 are respectively coupled to the quarter inner panels 7, and the opposite ends of the front mounting member 3 are also respectively coupled to the quarter inner panels 7.

The floor panel 1 has sidewall parts 9 respectively formed to be bent upwards on the opposite sides thereof, and then extends laterally from each of the sidewall parts 9 so as to be connected to a corresponding one of the quarter inner panels 7. Further, the partition member 5 has the lower end thereof deformed along the curvature of the floor panel 1 in the lateral direction of the vehicle body and coupled to the floor panel 1.

In addition, the front mounting member 3 is deformed along the curvature of the floor panel 1 in the lateral direction of the vehicle body so as to be coupled to the floor panel 1.

That is, the lower portion and the upper portion of the front mounting member 3 are deformed along the curvature of the floor panel 1 in the lateral direction of the vehicle body, as shown in the drawing.

Accordingly, the partition member 5 and the front mounting member 3 have a function of increasing coupling rigidity between the floor panel 1 and the quarter inner panels 7, thereby making it possible to reliably support the seat S mounted on the upper side of the floor panel 1.

For reference, in this embodiment, each of the quarter inner panels 7 has a shape of a wheel housing configured to surround the periphery of a rear wheel of a vehicle.

The partition member 5 includes a front surface part 11 coupled to the upper side of the floor panel 1, a rear surface part 13 coupled to the upper side of the floor panel 1 while being spaced apart from the front surface part 11 toward the rear of the vehicle body, and an upper surface part 15 configured to connect the upper ends of the front surface part 11 and the rear surface part 13. Here, each of the front surface part 11, the upper surface part 15, and the rear surface part 13 has a panel shape.

Here, the front surface part 11, the upper surface part 15, and the rear surface part 13 of the partition member 5 and the floor panel 1 form a closed cross-section.

Meanwhile, the partition member 5 may be formed by combining a panel forming the front surface part 11 with panels respectively forming the upper surface part 15 and the rear surface part 13 by welding or the like.

Alternatively, the partition member 5 may be formed in such a manner that the front surface part 11, the rear surface part 13, and the upper surface part 15 are respectively provided as separate panels and combined with each other, or the front surface part 11, the upper surface part 15, and the rear surface part 13 may be integrally formed by bending one of the panels.

Here, the partition member 5 may be formed in various ways as described above. Specifically, a space is provided inside the partition member 5 to form a closed cross-section so that the weight of a vehicle is not significantly increased, and the partition member 5 is required to form the closed cross-section with the floor panel 1 to fundamentally increase the rigidity of the vehicle body.

In addition, at least one bulkhead 17 is provided inside the partition member 5 to increase the rigidity of the partition member 5 itself. Accordingly, the seat S may be more stably supported additionally using a seat mounting bracket 19 to be described later, thereby making it possible to further increase the rigidity of the vehicle body.

For reference, in the drawing, a passing hole 21 formed in the partition member 5 is provided for welding of the bulkhead 17 or the like.

A plurality of the seat mounting brackets 19 configured to fix the seat S may be provided on the upper portion of the partition member 5.

The seat mounting bracket 19 may be appropriately installed depending on the number thereof required to fix the seat S or may be installed to increase the rigidity of the partition member 5.

The floor panel 1 has vehicle body rear side members 23 provided on the lower side thereof, wherein the vehicle body rear side members 23 are respectively provided on opposite sides of the vehicle body inside the sidewall parts 9 respectively formed on the opposite sides of the floor panel and formed to extend in the longitudinal direction of the vehicle body. Further, the floor panel 1 has a first rear cross member 25 provided on the lower side thereof, wherein the first rear cross member 25 is formed to extend in the lateral direction of the vehicle body so as to connect the front ends of the vehicle body rear side members 23 respectively provided on the opposite sides of the vehicle body.

In addition, the floor panel 1 has a second rear cross member 27 provided on the lower side thereof and formed to extend in the lateral direction of the vehicle body so as to connect the rear ends of the vehicle body rear side members 23 respectively provided on the opposite sides of the vehicle body.

Accordingly, both of the vehicle body rear side members 23, the first rear cross member 25, and the second rear cross member 27 are coupled to form a closed curve on the lower side of the floor panel 1, thereby securing more stable vehicle body rigidity. Further, the front mounting member 3 and the partition member 5 are positioned on the upper side of the floor panel 1 between the first rear cross member 25 and the second rear cross member 27, thereby making it possible to secure a more reliable support state of the seat S through this structural configuration.

Further, the floor panel 1 further has a third rear cross member 29 provided on the lower side thereof and formed to extend in the lateral direction of the vehicle body so as to connect the vehicle body rear side members 23 respectively provided on the opposite sides of the vehicle body, wherein the third rear cross member 29 is disposed between the first rear cross member 25 and the second rear cross member 27. In this manner, the rigidity of the vehicle body may be further improved.

Figure 3:
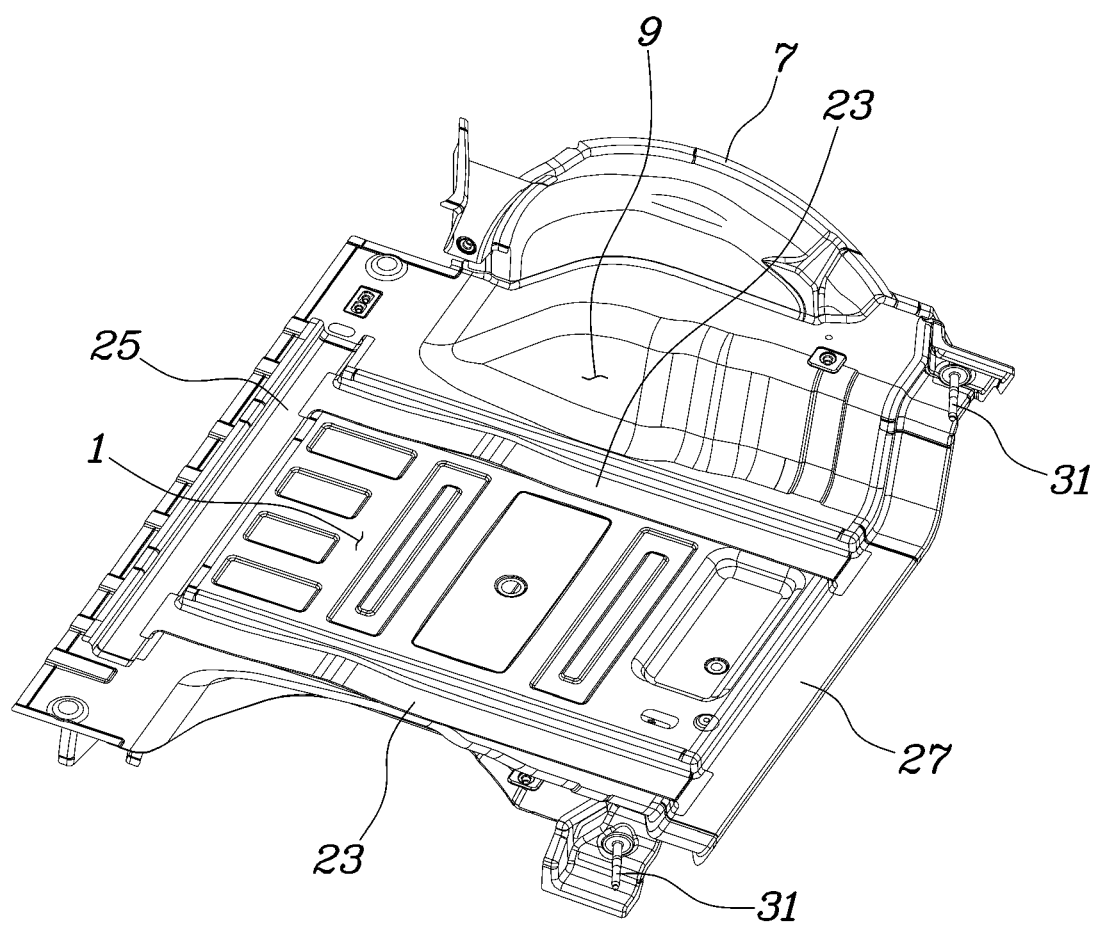
FIG. 3 is a view showing the vehicle body structure in FIG. 1, viewed from below.
Figure 4:
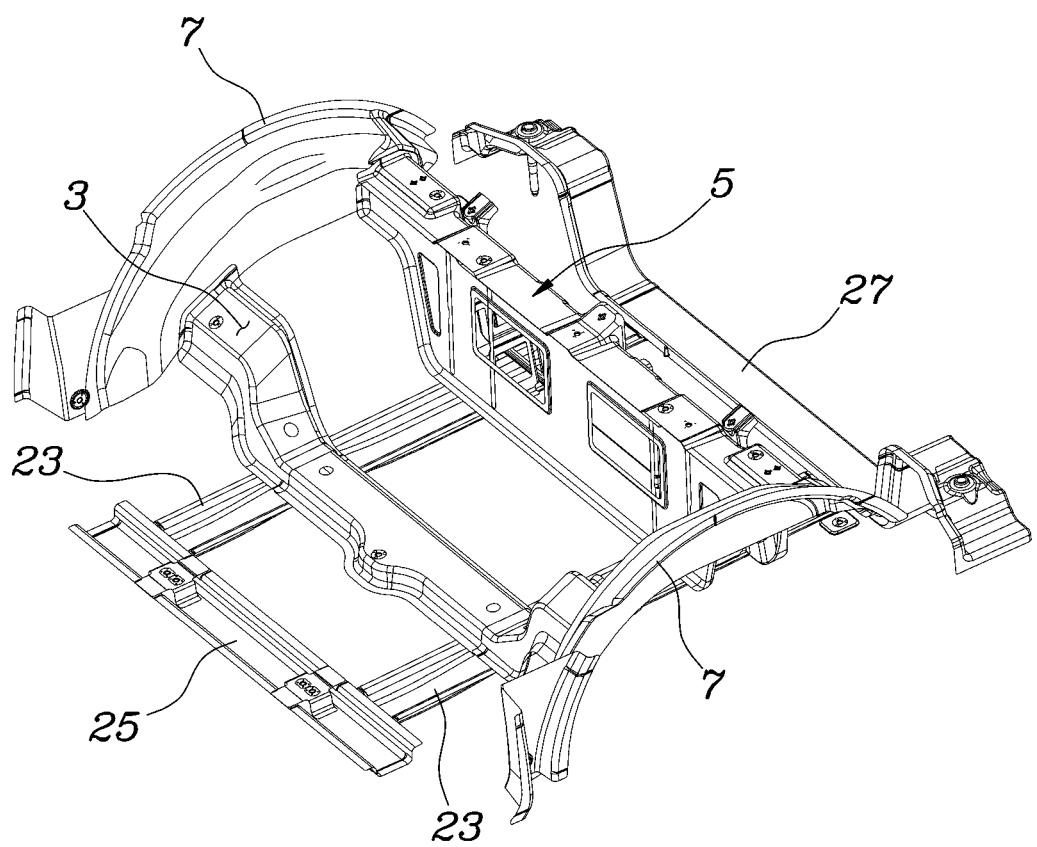
FIG. 4 is a view showing the state in which a floor panel is removed from the vehicle body structure in FIG. 1.
Figure 5:
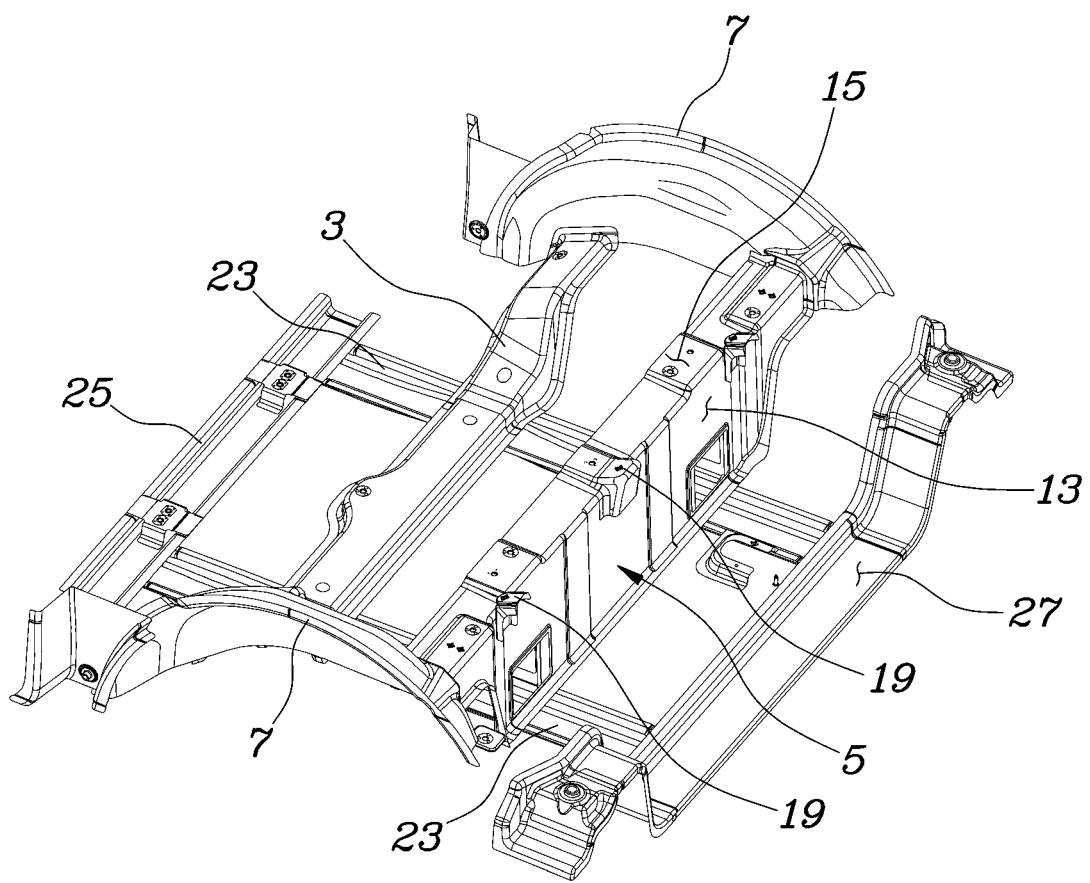
FIG. 5 is a view showing the vehicle body structure in FIG. 4, viewed from another angle.
Figure 6:
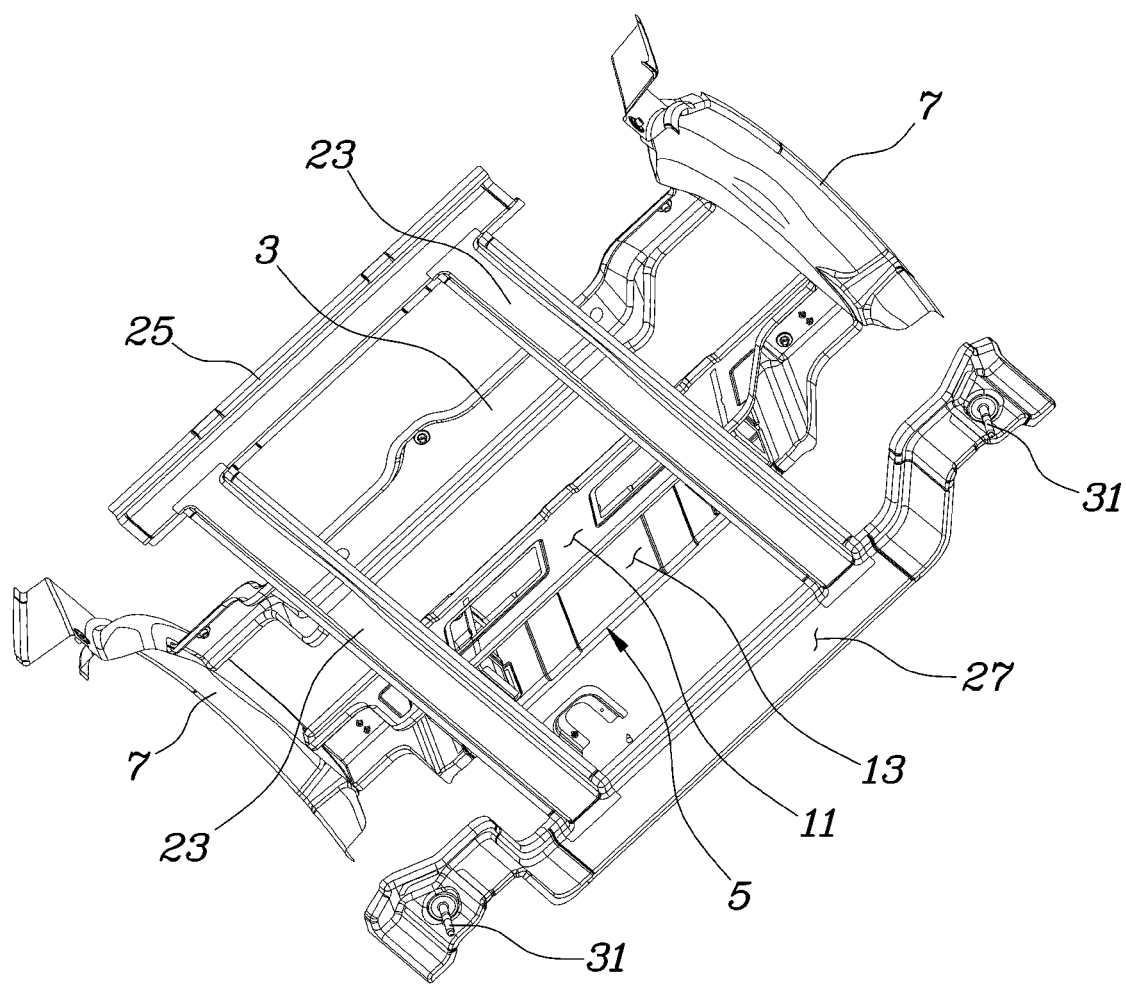
FIG. 6 is a view showing the vehicle body structure in FIG. 4, viewed from below.
Figure 7:
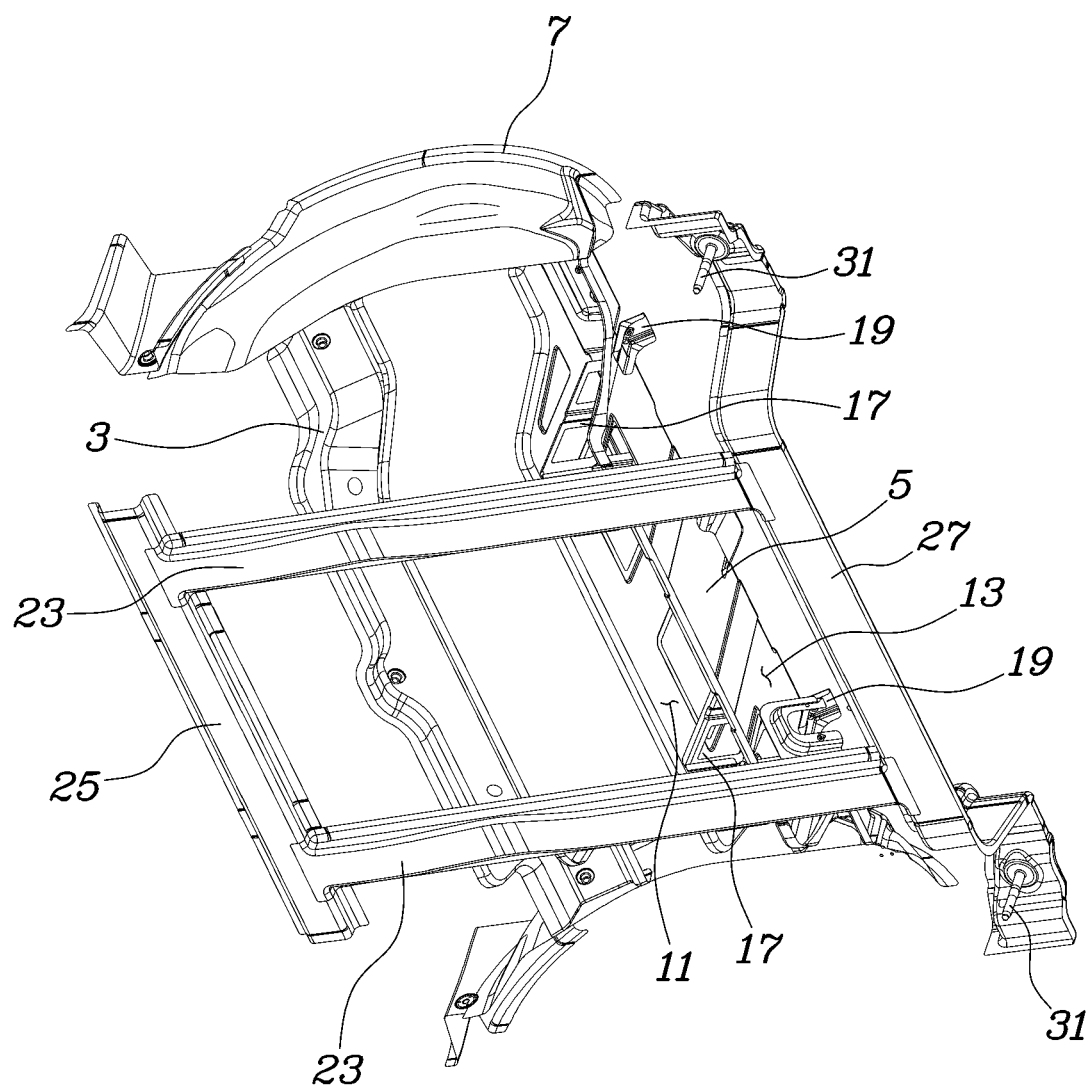
FIG. 7 is a view showing the vehicle body structure in FIG. 6, viewed from another angle.
Figure 8:
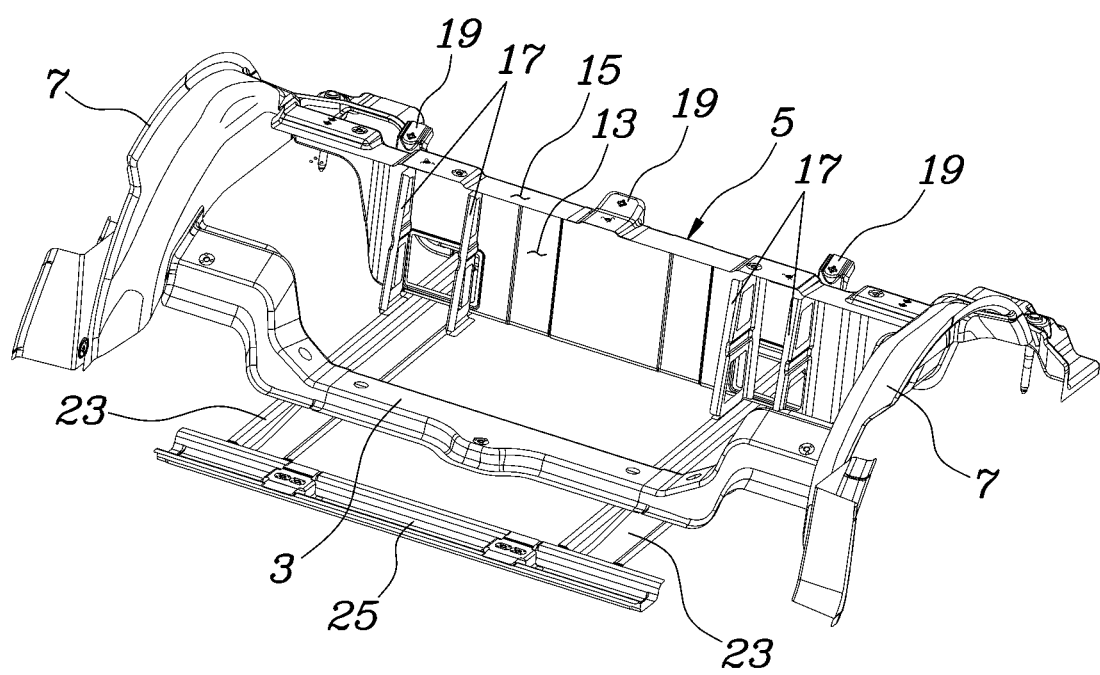
FIG. 8 is a view showing the state in which a front surface part of a partition member is removed from the vehicle body structure in FIG. 8.
Figure 9:
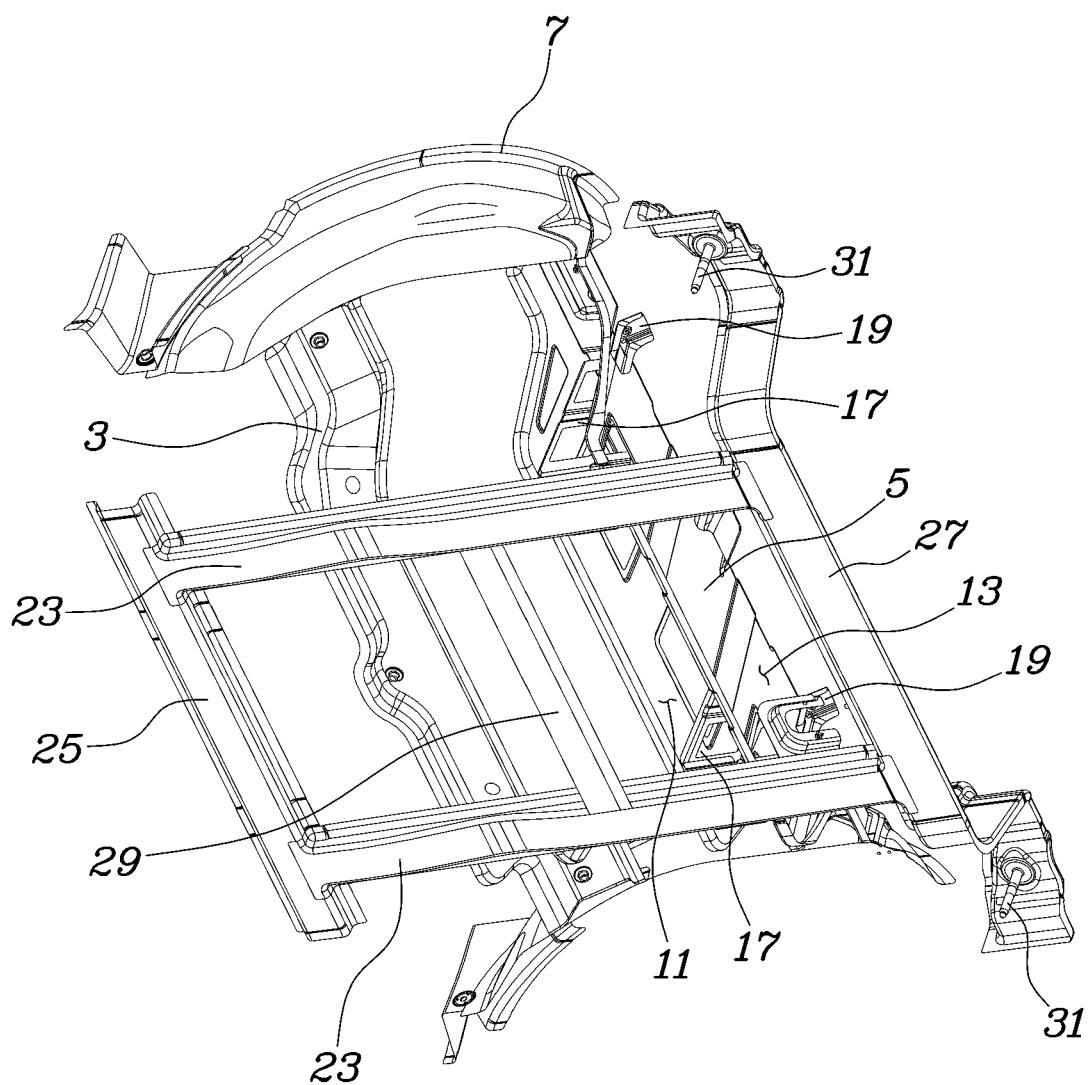
FIG. 9 is a view showing an example in which a third rear cross member is further provided in the vehicle body structure in FIG. 7.

For reference, the vehicle body configured as described above may be fixed to the upper side of a frame 2, and the second rear cross member 27 has coupling bolts 31 respectively provided on the opposite ends thereof and formed to protrude downwards, wherein the coupling bolts 31 are coupled to the frame 2 (refer to FIGS. 1 and 3). That is, the frame 2 may be coupled to the lower side of the floor panel 1 and the lower side of the second rear cross member 27.

Embodiments of the present invention as described above may be described as follows.

That is, the vehicle body structure according to embodiments of the present invention includes the floor panel 1, the vehicle body rear side members 23 respectively disposed on the opposite sides of the lower side of the floor panel 1 and formed to extend in the longitudinal direction of the vehicle body, the first rear cross member 25 formed to extend in the lateral direction of the vehicle body so as to connect the front ends of the vehicle body rear side members 23, the second rear cross member 27 formed to extend in the lateral direction of the vehicle body so as to connect the rear ends of the vehicle body rear side members 23, the front mounting member 3 disposed on the upper side of the floor panel 1 between the first rear cross member 25 and the second rear cross member 27 and formed to extend in the lateral direction of the vehicle body so as to fix the front lower side of the seat S, and the partition member 5 disposed on the upper side of the floor panel 1 between the first rear cross member 25 and the second rear cross member 27 and formed to extend in the lateral direction of the vehicle body so as to fix the rear lower side of the seat S.

The opposite ends of the floor panel 1 are respectively connected to the quarter inner panels 7. The floor panel 1 includes the sidewall parts 9 deformed upwards from the center of the floor panel 1 toward the opposite sides thereof and extends laterally from each of the sidewall parts 9 so as to be connected to a corresponding one of the quarter inner panels 7.

The partition member 5 includes, to form a closed cross-section using a vertical cross-section in the longitudinal direction of the vehicle body and the floor panel 1, the front surface part 11 coupled to the upper side of the floor panel 1 and positioned on the front side of the closed cross-section, the rear surface part 13 coupled to the upper side of the floor panel 1 and positioned on the rear side of the closed cross-section, and the upper surface part 15 configured to connect the upper ends of the front surface part 11 and the rear surface part 13.

The front surface part 11 and the rear surface part 13 of the partition member 5 respectively have lower ends deformed along the curvature of the floor panel 1 in the lateral direction of the vehicle body, and the opposite ends of the partition member 5 are respectively coupled to the quarter inner panels 7.

The partition member 5 has a plurality of the bulkheads 17 provided therein and coupled to at least two of the front surface part 11, the rear surface part 13, the upper surface part 15, or the floor panel 1.

The partition member 5 includes a plurality of seat mounting brackets 19 configured to fix the seat S.

The front mounting member 3 is deformed along a change in shape of the floor panel 1 in the lateral direction of the vehicle body, and the opposite ends thereof are respectively coupled to the quarter inner panels 7.

The third rear cross member 29 may be further provided between the first rear cross member 25 and the second rear cross member 27 to connect the vehicle body rear side members 23 respectively formed on the opposite sides of the vehicle body.

As is apparent from the above description, embodiments of the present invention provide a vehicle body structure configured not only to stably fix a seat on the floor in the state in which there is a large difference between the height of the floor near a rear wheel of a vehicle and the height of the seating surface of the seat mounted on the floor, but also to further improve the rigidity of a vehicle body without excessively increasing the weight of the vehicle.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A vehicle body structure comprising:
   a floor panel;
   a front mounting member on an upper side of the floor panel, wherein the front mounting member protrudes and extends in a lateral direction of a vehicle body so as to fix a front lower side of a seat; and
   a partition member at a rear of the front mounting member, wherein the partition member protrudes and extends in the lateral direction of the vehicle body so as to fix a rear lower side of the seat, wherein the partition member comprises:
     a front surface part coupled to the upper side of the floor panel;
     a rear surface part coupled to the upper side of the floor panel while being spaced apart from the front surface part toward a rear of the vehicle body; and
     an upper surface part connecting upper ends of the front surface part and the rear surface part, wherein each of the front surface part, the upper surface part, and the rear surface part has a panel shape.

2. The vehicle body structure according to claim 1, wherein:
   opposite ends of the floor panel are respectively connected to quarter inner panels;
   opposite ends of the partition member are respectively coupled to the quarter inner panels; and
   opposite ends of the front mounting member are respectively coupled to the quarter inner panels.

3. The vehicle body structure according to claim 2, wherein:
   the floor panel has sidewall parts bent upwards on opposite sides of the floor panel and extends laterally from each of the sidewall parts so as to be connected to a corresponding one of the quarter inner panels; and
   the partition member is coupled to the floor panel while a lower end thereof is deformed along a curvature of the floor panel in the lateral direction of the vehicle body.

4. The vehicle body structure according to claim 3, wherein the front mounting member is coupled to the floor panel while being deformed along the curvature of the floor panel in the lateral direction of the vehicle body.

5. The vehicle body structure according to claim 1, further comprising a bulkhead in the partition member.

6. The vehicle body structure according to claim 1, wherein:

the floor panel and the front surface part, the upper surface part, and the rear surface part of the partition member form a closed cross-section; and the front surface part or the rear surface part has a passing hole therein.

7. The vehicle body structure according to claim 3, further comprising a plurality of seat mounting brackets on an upper portion of the partition member, wherein the plurality of seat mounting brackets is configured to fix the seat.

8. The vehicle body structure according to claim 3, further comprising:
vehicle body rear side members on a lower side of the floor panel, wherein the vehicle body rear side members are respectively provided on opposite sides of the vehicle body inside the sidewall parts respectively formed on the opposite sides of the floor panel and extend in a longitudinal direction of the vehicle body; and
a first rear cross member on the lower side of the floor panel, wherein the first rear cross member extends in the lateral direction of the vehicle body so as to connect front ends of the vehicle body rear side members respectively provided on the opposite sides of the vehicle body.

9. The vehicle body structure according to claim 8, further comprising a second rear cross member on the lower side of the floor panel and extending in the lateral direction of the vehicle body so as to connect rear ends of the vehicle body rear side members respectively provided on the opposite sides of the vehicle body.

10. The vehicle body structure according to claim 9, further comprising a third rear cross member on the lower side of the floor panel and extending in the lateral direction of the vehicle body so as to connect the vehicle body rear side members respectively provided on the opposite sides of the vehicle body, wherein the third rear cross member is disposed between the first rear cross member and the second rear cross member.

11. A vehicle body structure comprising:
a floor panel;
vehicle body rear side members respectively disposed on opposite sides of a lower side of the floor panel and extending in a longitudinal direction of a vehicle body;
a first rear cross member extending in a lateral direction of the vehicle body and connecting front ends of the vehicle body rear side members;
a second rear cross member extending in the lateral direction of the vehicle body and connecting rear ends of the vehicle body rear side members;
a front mounting member disposed on an upper side of the floor panel between the first rear cross member and the second rear cross member and extending in the lateral direction of the vehicle body so as to fix a front lower side of a seat; and
a partition member disposed on the upper side of the floor panel between the first rear cross member and the second rear cross member and extending in the lateral direction of the vehicle body so as to fix a rear lower side of the seat.

12. The vehicle body structure according to claim 11, wherein:
opposite ends of the floor panel are respectively connected to quarter inner panels; and
the floor panel has sidewall parts deformed upwards from a center of the floor panel toward opposite sides thereof and extends laterally from each of the sidewall parts so as to be connected to a corresponding one of the quarter inner panels.

13. The vehicle body structure according to claim 12, wherein, to define a closed cross-section using a vertical cross-section in the longitudinal direction of the vehicle body and the floor panel, the partition member comprises:
a front surface part coupled to the upper side of the floor panel and positioned on a front side of the closed cross-section;
a rear surface part coupled to the upper side of the floor panel and positioned on a rear side of the closed cross-section; and
an upper surface part configured to connect upper ends of the front surface part and the rear surface part.

14. The vehicle body structure according to claim 13, wherein:
the front surface part and the rear surface part of the partition member respectively have lower ends deformed along a curvature of the floor panel in the lateral direction of the vehicle body; and
opposite ends of the partition member are respectively coupled to the quarter inner panels.

15. The vehicle body structure according to claim 13, further comprising a plurality of bulkheads in the partition member and coupled to at least two of the front surface part, the rear surface part, the upper surface part, or the floor panel.

16. The vehicle body structure according to claim 15, wherein the partition member comprises a plurality of seat mounting brackets configured to fix the seat.

17. The vehicle body structure according to claim 12, wherein the front mounting member is deformed along a change in shape of the floor panel in the lateral direction of the vehicle body and has opposite ends thereof respectively coupled to the quarter inner panels.

18. The vehicle body structure according to claim 11, further comprising a third rear cross member provided between the first rear cross member and the second rear cross member and configured to connect the vehicle body rear side members respectively provided on the opposite sides of the floor panel.

19. The vehicle body structure according to claim 11, further comprising a frame coupled to the lower side of the floor panel and a lower side of the second rear cross member.

20. A vehicle body structure comprising:
a floor panel;
a front mounting member on an upper side of the floor panel, wherein the front mounting member protrudes and extends in a lateral direction of a vehicle body so as to fix a front lower side of a seat; and
a partition member at a rear of the front mounting member, wherein the partition member protrudes and extends in the lateral direction of the vehicle body so as to fix a rear lower side of the seat;
wherein opposite ends of the floor panel are respectively connected to quarter inner panels;
wherein opposite ends of the partition member are respectively coupled to the quarter inner panels;
wherein opposite ends of the front mounting member are respectively coupled to the quarter inner panels;
wherein the floor panel has sidewall parts bent upwards on opposite sides of the floor panel and extends laterally from each of the sidewall parts so as to be connected to a corresponding one of the quarter inner panels;

wherein the partition member is coupled to the floor panel while a lower end thereof is deformed along a curvature of the floor panel in the lateral direction of the vehicle body;

wherein the partition member comprises a front surface part coupled to the upper side of the floor panel, a rear surface part coupled to the upper side of the floor panel while being spaced apart from the front surface part toward a rear of the vehicle body, and an upper surface part connecting upper ends of the front surface part and the rear surface part;

wherein each of the front surface part, the upper surface part, and the rear surface part has a panel shape;

wherein the floor panel and the front surface part, the upper surface part, and the rear surface part of the partition member form a closed cross-section; and wherein the front surface part or the rear surface part has a passing hole therein.

* * * * *